US011922895B2

(12) United States Patent
Um et al.

(10) Patent No.: US 11,922,895 B2
(45) Date of Patent: Mar. 5, 2024

(54) LIQUID CRYSTAL DISPLAY PANEL, DRIVING METHOD, AND TERMINAL THEREOF

(71) Applicant: Shenzhen China Star Optoelectronics Semiconductor Display Technology Co., Ltd., Guangdong (CN)

(72) Inventors: Yoonsung Um, Guangdong (CN); Lixia Li, Guangdong (CN); Bangyin Peng, Guangdong (CN); Yingchun Zhao, Guangdong (CN); Fen Long, Guangdong (CN); Qiqi Zhang, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 45 days.

(21) Appl. No.: 17/614,338

(22) PCT Filed: Nov. 5, 2021

(86) PCT No.: PCT/CN2021/128850
§ 371 (c)(1),
(2) Date: Nov. 25, 2021

(87) PCT Pub. No.: WO2023/070723
PCT Pub. Date: May 4, 2023

(65) Prior Publication Data

US 2023/0143514 A1 May 11, 2023

(30) Foreign Application Priority Data

Nov. 6, 2021 (CN) ......................... 202111263219.7

(51) Int. Cl.
*G09G 3/36* (2006.01)

(52) U.S. Cl.
CPC ......... *G09G 3/3607* (2013.01); *G09G 3/3614* (2013.01); *G09G 2300/0452* (2013.01);
(Continued)

(58) Field of Classification Search
None
See application file for complete search history.

(56) References Cited

U.S. PATENT DOCUMENTS

2010/0110114 A1* 5/2010 Hashimoto .......... G09G 3/3614 345/88
2012/0098871 A1* 4/2012 Park ..................... G09G 3/2003 257/E33.012
(Continued)

FOREIGN PATENT DOCUMENTS

CN 103235431 A 8/2013
CN 104766564 A 7/2015
(Continued)

*Primary Examiner* — Parul H Gupta
(74) *Attorney, Agent, or Firm* — Rivka Friedman

(57) ABSTRACT

A liquid crystal display panel, a driving method, and a terminal thereof are disclosed. The display panel includes a pixel structure including data lines and scan lines, wherein each data line is connected to at least two pixel groups, and each pixel group includes three sub-pixels having different colors sequentially connected to the data lines; and a first driving unit electrically connected to the scan lines and inputting scan signals to the scan lines in a preset order to solve a problem of horizontal bright and dark lines.

10 Claims, 9 Drawing Sheets

(52) U.S. Cl.
CPC ............... *G09G 2320/0233* (2013.01); *G09G 2320/0242* (2013.01)

(56) References Cited

U.S. PATENT DOCUMENTS

| | | | | |
|---|---|---|---|---|
| 2014/0118657 | A1 | 5/2014 | Duan | |
| 2016/0232859 | A1* | 8/2016 | Oh | G09G 3/3611 |
| 2016/0329023 | A1 | 11/2016 | Zhao et al. | |
| 2017/0032749 | A1* | 2/2017 | Liu | G09G 3/3607 |
| 2019/0115368 | A1 | 4/2019 | Li | |
| 2020/0118511 | A1 | 4/2020 | Chen | |

FOREIGN PATENT DOCUMENTS

| | | | |
|---|---|---|---|
| CN | 104849929 | A | 8/2015 |
| CN | 106932988 | A | 7/2017 |
| CN | 109709735 | A | 5/2019 |
| CN | 110174804 | A | 8/2019 |
| CN | 110956921 | A | 4/2020 |
| CN | 111540323 | A | 8/2020 |
| CN | 112540487 | A | 3/2021 |
| CN | 113552752 | A | 10/2021 |
| JP | WO2011055754 | A1 | 3/2013 |

* cited by examiner

LIQUID CRYSTAL DISPLAY PANEL, DRIVING METHOD, AND TERMINAL THEREOF

BACKGROUND OF DISCLOSURE

Field of Disclosure

The present disclosure relates to a field of display technology, and in particular to a liquid crystal display panel, a driving method, and a terminal thereof.

Description of Prior Art

In a liquid crystal display (LCD) panel, a twice-flipping pixel architecture has a problem of obvious horizontal bright and dark lines due to different pixel charging levels, which seriously affects quality of a display screen.

SUMMARY OF DISCLOSURE

The present disclosure aims to provide a liquid crystal display panel, a driving method, and a terminal thereof, so as to solve a technical problem of horizontal bright and dark lines of a twice-flipping pixel architecture.

In order to achieve the above purposes, the present disclosure provides a liquid crystal display panel, comprising: a pixel structure comprising more than two sub-pixels arranged in a pixel matrix and data lines and scan lines arranged perpendicular to each other, wherein colors of three adjacent sub-pixels located in a same row are different, colors of all sub-pixels located in a same column are same, each of the scan lines is located between two adjacent rows of sub-pixels, each of the data lines is located between two adjacent columns of sub-pixels, each of the data lines is connected to at least two pixel groups, and each of the pixel groups comprises three sub-pixels having different colors sequentially connected to the data lines; and a first driving unit electrically connected to the scan lines, and inputting scan signals to the scan lines under a preset order.

In addition, each of the pixel groups comprises a first sub-pixel, a second sub-pixel, and a third sub-pixel, wherein in each of the pixel groups, when the first sub-pixel is located in an x-th row and a y-th column of the pixel matrix, the second sub-pixel is located in an (x+2)-th row and a (y+1)-th column of the pixel matrix, and the third sub-pixel is located in an (x+4)-th row and a (y+2)-th column of the pixel matrix; or in each of the pixel groups, when the first sub-pixel is located in the x-th row and y-th column of the pixel matrix, the second sub-pixel is located in the (x+2)-th row and a (y−1)-th column of the pixel matrix, and the third sub-pixel is located in the (x+4)-th row and a (y−2)-th column of the pixel matrix.

In addition, each of the pixel groups comprises a first sub-pixel, a second sub-pixel, and a third sub-pixel, wherein in each of the pixel groups, when the first sub-pixel is located in an x-th row and a y-th column the pixel matrix, the second sub-pixel is located in an (x+2)-th row and a (y+1)-th column of the pixel matrix, and the third sub-pixel is located in an (x+4)-th row and a (y−1)-th column of the pixel matrix; or in each of the pixel groups, when the first sub-pixel is located in the x-th row and y-th column of the pixel matrix, the second sub-pixel is located in the (x+2)-th row and the (y−1)-th column of the pixel matrix, and the third sub-pixel is located in the (x+4)-th row and the (y+1)-th column of the pixel matrix.

In addition, the at least two pixel groups comprise a first pixel group and a second pixel group, and the data lines are sequentially connected to the first sub-pixel of the first pixel group, the first sub-pixel of the second pixel group, the second sub-pixel of the first pixel group, the second sub-pixel of the second pixel group, the third sub-pixel of the first pixel group, and the third sub-pixel of the second pixel group.

In addition, the pixel structure has at least one scan period; the preset order comprises: in one scan period, the first driving unit first inputs scan signals to scan lines connected to the first pixel group, and then inputs scan signals to scan lines connected to the second pixel group; or in one scan period, the first driving unit first inputs scan signals to the scan lines connected to the second pixel group, and then inputs scan signals to the scan lines connected to the first pixel group.

In addition, the liquid crystal display panel further comprises: a second driving unit electrically connected to the data lines; in one scan period, the second driving unit inputs positive polarity gray-scale voltages to data lines in odd columns, and inputs negative polarity gray-scale voltages to data lines in even columns; or, in one scan period, the second driving unit inputs negative polarity gray-scale voltages to the data lines in odd columns, and inputs positive-polarity gray-scale voltages to the data lines in even columns.

In order to achieve the above purposes, the present disclosure further provides a driving method of the liquid crystal display panel, wherein the driving method comprises following steps: the first driving unit inputs scan signals to the scan lines in the preset order, so that a first sub-pixel of each of the pixel groups is recharged.

In addition, the pixel structure has at least one scan period; the preset order comprises: in one scan period, the first driving unit first inputs scan signals to scan lines connected to the first pixel group, and then inputs scan signals to scan lines connected to the second pixel group; or in one scan period, the first driving unit first inputs scan signals to the scan lines connected to the second pixel group, and then inputs scan signals to the scan lines connected to the first pixel group.

In addition, when the first driving unit inputs scan signals to the scan lines connected to the first pixel group, the first sub-pixel of the first pixel group performs recharging; and when the first driving unit inputs scan signals to the scan lines connected to the second pixel group, the first sub-pixel of the second pixel group performs recharging.

In addition, the driving method further comprises: in one scan period, the second driving unit inputs positive polarity gray-scale voltages to data lines in odd columns, and inputs negative-polarity gray-scale voltages to data lines in even columns; or, in one scan period, the second driving unit inputs negative polarity gray-scale voltages to the data lines in odd columns, and inputs positive polarity gray-scale voltages to the data lines in even columns.

In order to achieve the above purposes, the present disclosure further comprises a terminal, and the terminal comprises a terminal body and the liquid crystal display panel described above, and the liquid crystal display panel is connected to the terminal body.

Compared to the prior art, the present disclosure provides a liquid crystal display device, a driving method, and a terminal thereof. The liquid crystal display panel comprises the pixel structure capable of performing twice flipping. Any data line of the pixel structure is connected to at least two pixel groups, and sub-pixels in two adjacent pixel groups are arranged alternatively. A charging order of one data line is changed from an original charging order R (red sub-pixels) →G (green sub-pixels) to R (the red sub-pixels)→G (the green sub-pixels)→B (blue sub-pixels), and a scan order of the scan lines is changed (that is, an opening timing of gates is changed) from a conventional G1→G2→G3→G4→G5→G6 to G1→G3→G5→G2→G4→G6. Corresponding sub-pixels are connected to pixel electrodes in a cross-line manner, that is, sub-pixels having three different colors and located in different columns are be driven simultaneously through the cross-line manner, so that the pixel structure can implement the twice flipping while first and second rows of the sub-pixels are all recharged in one scan period, thereby solving a problem of horizontal bright and dark lines, equalizing display brightness, effectively solving a problem of color crosstalk, and improving quality of the liquid crystal display panel.

DESCRIPTION OF DRAWINGS

Technical solutions and other beneficial effects of the present disclosure will be apparent from detailed description of specific embodiments of the present disclosure with reference to accompanying drawings.

REFERENCE SIGNS ARE AS FOLLOWS

100, pixel structure; 101, first sub-pixel;
102, second sub-pixel; 103, third sub-pixel;
110*a*, first pixel group; 110*b*, second pixel group;
10, first driving unit; 20, second driving unit;
30, thin film transistor;
51, substrate; 52, gate layer;
53, gate insulating layer; 54, first contact layer;
55, second contact layer; 56, source and drain layer;
57, insulating layer; 58, pixel electrode;
61, first through hole; 62, second through hole;
63, third through hole.

DETAILED DESCRIPTION OF EMBODIMENTS

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within protection scope of the present disclosure.

Embodiment 1

Figure 1:
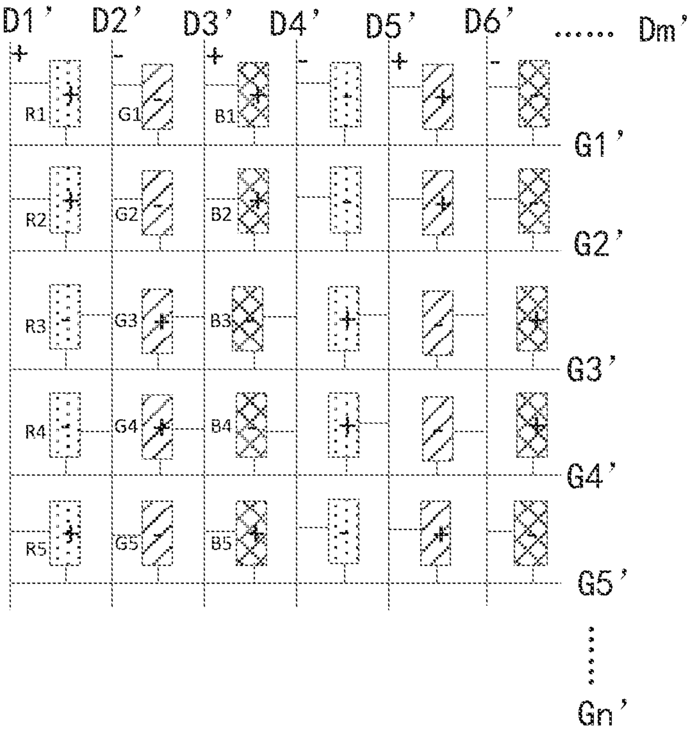
FIG. 1 is a schematic diagram of a pixel structure in the prior art.
Figure 2:
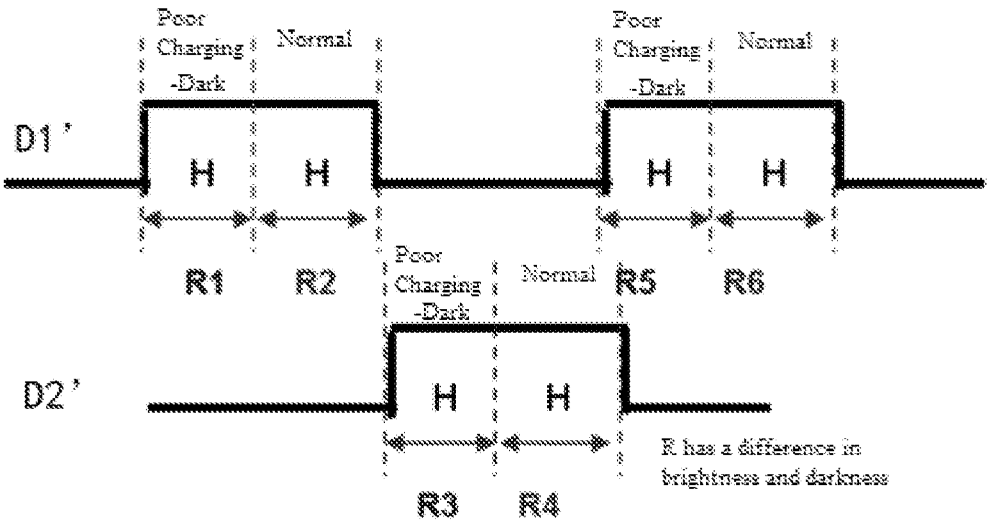
FIG. 2 is a waveform diagram of a sub-pixel in FIG. 1 in monochrome display.

FIG. 1 is a schematic diagram of a pixel structure in the prior art. FIG. 2 is a waveform diagram of a sub-pixel in FIG. 1 in monochrome display.

As shown in FIGS. 1-2, a liquid crystal display panel comprises m data lines D1'-Dm' and n scan lines G1'-Gn' (gate line). The data lines extend in a vertical direction, and the scan lines extend in a horizontal direction to intersect with the data lines to form a plurality of sub-pixels. Sub-pixels of a same color can be arranged in the vertical direction, sub-pixels of red, green, and blue can be arranged cyclically in order in the horizontal direction. A data line charges two adjacent columns of sub-pixels in a staggered manner to enable connection of column flipping and dot flipping.

When the pixel structure performs monochromatic display, a data line simultaneously charges two adjacent pixels R1 and R2 in a same column, wherein the sub-pixel R1 is overloaded since a voltage of a previous sub-pixel is low (in a dark state), which causes brightness of the sub-pixel R1 to dim. The sub-pixel R2 is under a light load since the sub-pixel R1 is high (in a bright state), and brightness of the sub-pixel R2 after fully charged is normal. Since charging levels of the sub-pixel R1 and the sub-pixel R2 are different due to light and heavy load, sub-pixels R1 in dark display are concentrated in one row, and sub-pixels R2 in bright display are concentrated in another row. Therefore, it may cause uneven brightness and darkness on the display panel, resulting in obvious periodic strips of bright and dark, which can be seen too obviously by naked eyes and results in poor visual effect.

This embodiment provides the liquid crystal display panel, which comprises the pixel structure capable of performing twice flipping. Any data line of the pixel structure can simultaneously drive sub-pixels of three different colors and located in different columns in a cross-line manner. A charging order of the data lines is changed from an original charging order of R (red sub-pixels)→G (green sub-pixels) to R (the red sub-pixels)→G (the green sub-pixels)→B (blue sub-pixels), and a scan order of the scan lines is changed (that is, an opening timing of gates is changed) from a conventional G1→G2→G3→G4→G5→G6 to G1→G3→G5→G2→G4→G6. Corresponding sub-pixels are connected to pixel electrodes in the cross-line manner, so that the pixel structure can implement the twice flipping while the sub-pixels are recharged, thereby solving a problem of horizontal bright and dark lines, equalizing display brightness, effectively solving a problem of color crosstalk, and improving quality of the liquid crystal display panel.

Figure 3:
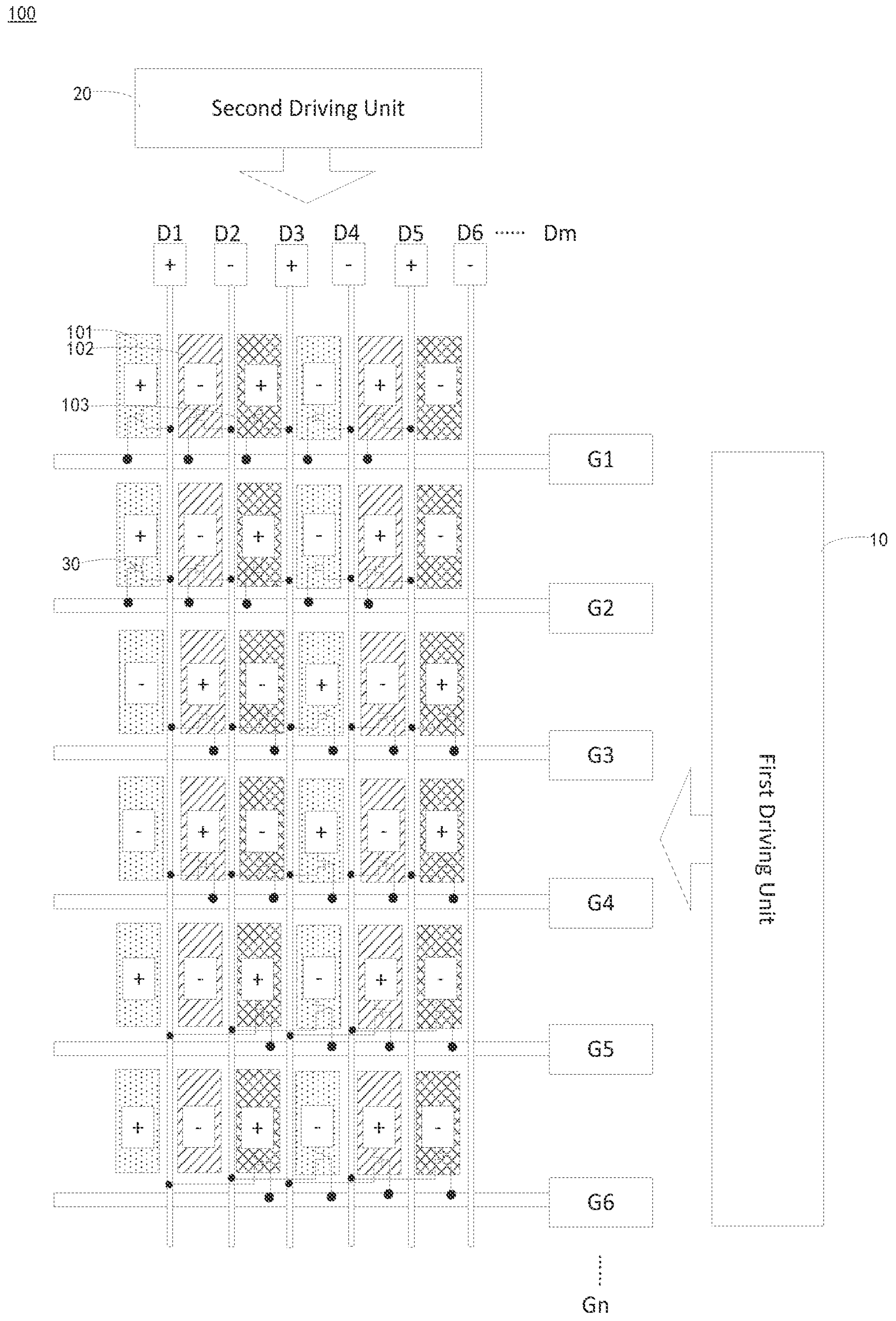
FIG. 3 is a schematic structural diagram of a pixel structure according to Embodiment 1 of the present disclosure.

FIG. 3 is a schematic structural diagram of a pixel structure according to Embodiment 1 of the present disclosure.

As shown in FIG. 3, the pixel structure comprises two or more sub-pixels arranged in a pixel matrix, and data lines and scan lines arranged perpendicular to each other.

Specifically, the pixel structure comprises m data lines D1, D2, D3, . . . , (Dm-2), (Dm-1), Dm parallel to each other, and n scan lines G1, G2, G3, . . . , (Gn-2), (Gn-1), Gn parallel to each other. Each data line is located between two adjacent columns of sub-pixels, and each scan line is located between two adjacent rows of sub-pixels. Wherein three adjacent sub-pixels in a same row have different colors, and all sub-pixels in a same column have a same color. The sub-pixels comprise first sub-pixels 101, second sub-pixels 102, and third sub-pixels 103 of different colors, the first sub-pixels 101 are red sub-pixels, the second sub-pixels 102 are green sub-pixels, and the third sub-pixels 103 are blue sub-pixels.

In this embodiment, a plurality of first sub-pixels 101 are arranged in a matrix into a first column of pixels and located on a left side of a first data line D1, a plurality of second sub-pixels 102 are arranged in matrix into a second column of pixels and located on a left side of a second data line D2, a plurality of third sub-pixels 103 are arranged in matrix into a third column of pixels and located on a left side of a third data line D3, a plurality of first sub-pixels 101 are arranged in matrix into a fourth column of pixels and located on left side of the fourth data line D4, etc. Simply speaking, all sub-pixels in a same column have a same color, sub-pixels of different colors are cyclically arranged in a row direction according to an order of the first sub-pixels 101, the second sub-pixels 102, and the third sub-pixels 103, or an order of the second sub-pixels 102, the third sub-pixels 103, and the first sub-pixels 101, or an order of the third sub-pixels 103, the first sub-pixels 101, and the second sub-pixels 102.

Figure 4:
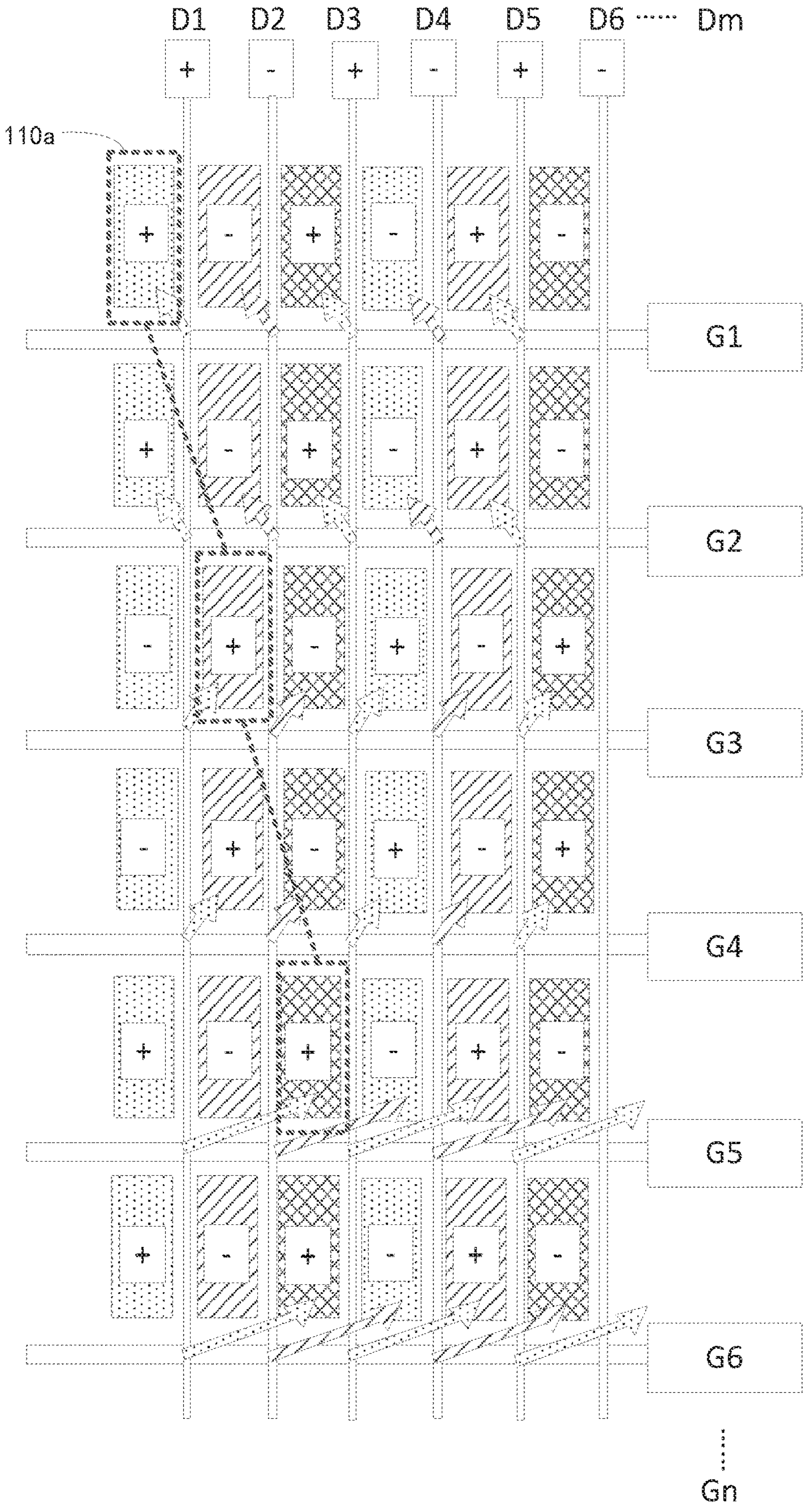
FIG. 4 is a schematic structural diagram of a first pixel group according to Embodiment 1 of the present disclosure.
Figure 5:
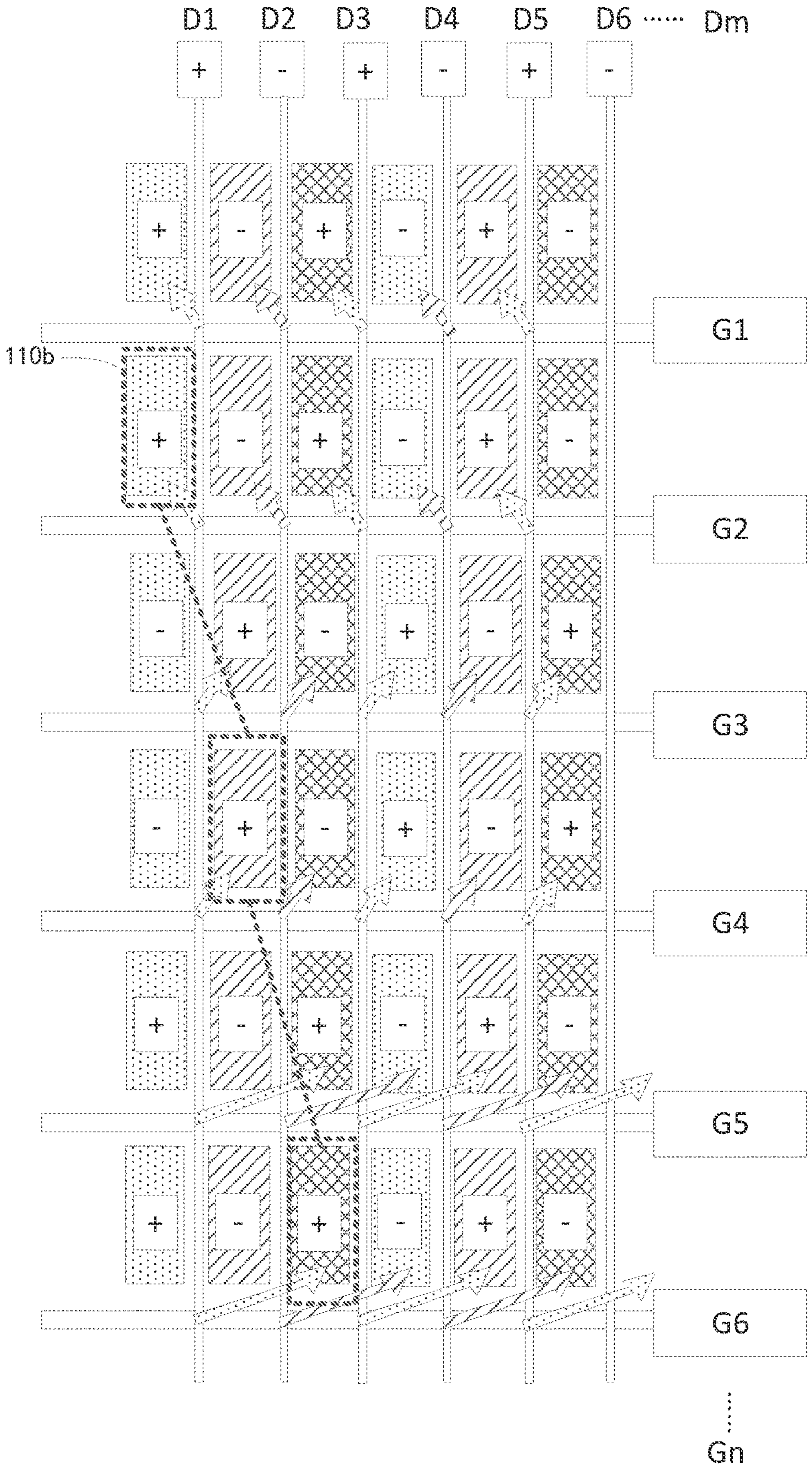
FIG. 5 is a schematic structural diagram of a second pixel group according to Embodiment 1 of the present disclosure.

FIG. 4 is a schematic structural diagram of a first pixel group according to Embodiment 1 of the present disclosure. FIG. 5 is a schematic structural diagram of a second pixel group according to Embodiment 1 of the present disclosure.

As shown in FIGS. 4-5, each data line is connected to two or more pixel groups 110*a* and 110*b*, and each of pixel groups 110*a* and 110*b* comprises one first sub-pixel 101, one second sub-pixel 102, and one third sub-pixel 103.

In one of the pixel groups 110*a* and 110*b*, the first sub-pixel 101 and the second sub-pixel 102 are respectively located on both sides of a data line (e.g., the data line D1), and the third sub-pixel 103 and the second sub-pixel 102 are located on a same side of the data line (e.g., the data line D1). Wherein, two scan lines (i.e., the scan lines G1, G2) are disposed between the first sub-pixel 101 and the second sub-pixel 102, two data lines (i.e., the data lines D1, D2) and four scan lines (i.e., the scan lines G1, G2, G3, G4) are disposed between the first sub-pixel 101 and the third sub-pixel 103, and one data line (i.e., the data line D2) and two scan lines (i.e., the scan lines G3, G4) are disposed between the second sub-pixel 102 and the third sub-pixel 103. Of course, in other embodiments, in a pixel group, the first sub-pixel and the second sub-pixel are respectively located on both sides of a data line, and the third sub-pixel and the first sub-pixel are located on a same side of the data line. Wherein, two scan lines are disposed between the first sub-pixel and the second sub-pixel, one data line and two scan lines are disposed between the first sub-pixel and the third sub-pixel, and two data lines and four scan lines are disposed between the second sub-pixel and the third sub-pixel.

In one of the pixel groups 110*a* and 110*b*, when the first sub-pixel 101 is located in an x-th row and a y-th column of the pixel matrix, the second sub-pixel 102 is located in an (x+2)-th row and a (y+1)-th column of the pixel matrix, and the third sub-pixel 103 is located in an (x+4)-th row and a (y+2)-th column of the pixel matrix.

Specifically, as shown in FIGS. 3 to 5, each data line is sequentially connected to the first sub-pixel 101 of the first pixel group 110*a*, the first sub-pixel 101 of the second pixel group 110*b*, the second sub-pixel 102 of the first pixel group 110*a*, the second sub-pixel 102 of the second pixel group 110*b*, the third sub-pixel 103 of the first pixel group 110*a*, and the third sub-pixel 103 of the second pixel group 110*b*.

When the first sub-pixel 101 of the first pixel group 110*a* is located in the x-th row and the y-th column of the pixel matrix, the first sub-pixel 101 of the second pixel group 110*b* is located in an (x+1)-th row and the y-th column of the pixel matrix, the second sub-pixel 102 of the first pixel group 110*a* is located in the (x+2)-th row and the (y+1)-th column of the pixel matrix, the second sub-pixel 102 of the second pixel group 110*b* is located in an (x+3)-th row and the (y+1)-th column of the pixel matrix, the third sub-pixel 103 of the first pixel group 110*a* is located in the (x+4)-th row and the (y+2)-th column of the pixel matrix, and the third sub-pixel 103 of the second pixel group 110*b* is located in an (x+5)-th row and the (y+2)-th column of the pixel matrix. Wherein x and y are natural numbers.

Figure 6:
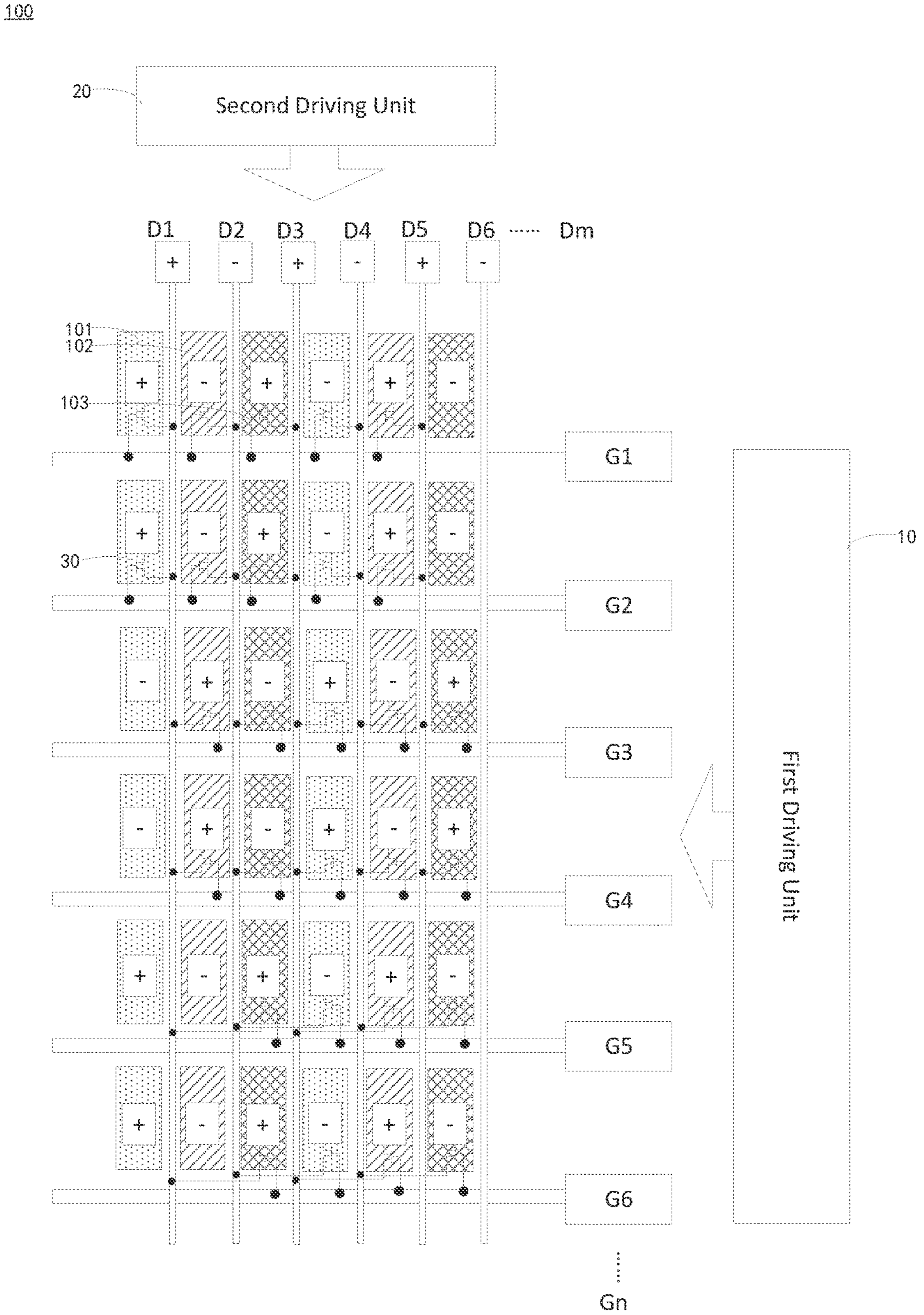
FIG. 6 is a driving schematic diagram of the pixel structure according to Embodiment 1 of the present disclosure.

FIG. 6 is a schematic diagram of driving the pixel structure according to Embodiment 1 of the present disclosure.

As shown in FIGS. 4 to 6, the liquid crystal display panel comprises a first driving unit 10 and a second driving unit 20. The first driving unit 10 is a gate driver, such as a gate on array (GOA) driving circuit, and the second driving unit 20 is a source driver.

The first driving unit 10 is electrically connected to the scan lines, and the first driving unit 10 inputs scan signals to the scan lines in a preset order so that the first sub-pixel of each pixel group is recharged.

Specifically, the pixel structure 100 has a plurality of scan periods, and the first driving unit 10 first scans adjacent sub-pixels in first to sixth rows as a first scan period, and then scans adjacent sub-pixels in seventh to twelfth rows as a second scan period . . . and so on. It should be noted that in this embodiment, a minimum scan period is six lines, wherein the scan period and may be 12 lines, 18 lines, or the like, which are multiples of 6.

The preset order includes: in a scan period, the first driving unit 10 first inputs scan signals to the scan lines (e.g., the scan lines G1, G3, G5) connected to the first pixel group 110*a*, and then inputs scan signals to the scan lines (e.g., the scan lines G2, G4, G6) connected to the second pixel group 110*b*. Alternatively, in a scan period, the first driving unit 10 first inputs scan signals to the scan lines (e.g., the scan lines G2, G4, G6) connected to the second pixel group 110*b*, and then inputs scan signals to the scan lines (e.g., the scan lines G1, G3, G5) connected to the first pixel group 110*a*. It should be noted that, in a scan period, the first driving unit 10 inputs scan signals to the first pixel group 110*a* and the second pixel group 110*b* connected to each scan line in the above-described preset order.

When the first driving unit 10 inputs scan signals to the scan lines (e.g., the scan lines G1, G3, G5) connected to the first pixel group 110*a*, the first sub-pixel of the first pixel group 110*a* realizes recharging. From the entire pixel structure 100, that is, the sub-pixels (the first sub-pixel 101, the second sub-pixel 102, and the third sub-pixel 103) located in a first row are all recharged. When the first driving unit 10 inputs scan signals to the scan lines connected to the second pixel group 110*b*, the first sub-pixel of the second pixel group 110*b* is recharged. From the entire pixel structure 100, that is, the sub-pixels (the first sub-pixel 101, the second sub-pixel 102, and the third sub-pixel 103) located in a second row are all recharged. Therefore, when the liquid crystal display panel realizes the monochromic display, when the scan lines G1→G3→G5 are turned on, the sub-pixels in the first row are recharged, and when G2→G4→G6 are turned on, the sub-pixels in the second row are recharged. In this case, two adjacent rows of sub-pixels with same colors in the column direction are recharged, thereby solving the problem of the horizontal bright and dark lines that is prone to appear to the twice flipping pixel structure.

In this embodiment, the second driving unit 20 is electrically connected to the data lines. During a scan period, the second driving unit 20 inputs positive polarity grayscale voltages (+) to the data lines (e.g., D1, D3, D5, D7) of odd columns, and inputs negative polarity gray-scale voltages (−) to the data lines (e.g., D2, D4, D6) of even columns. Certainly, in other embodiments, a driving mode of the second driving unit 20 is that, in a scan period, the second driving unit inputs negative polarity grayscale voltages (−) to the data lines of odd columns and inputs positive polarity grayscale voltages (+) to the data lines of even columns.

As shown in FIG. 6, the pixel structure 100 comprises thin film transistors 30, each of the thin film transistors 30 is disposed in a pixel region of each sub-pixel, a gate is electrically connected to a corresponding scan line, a source is electrically connected to a corresponding data line, and a drain is electrically connected to a corresponding sub-pixel.

Figure 7:
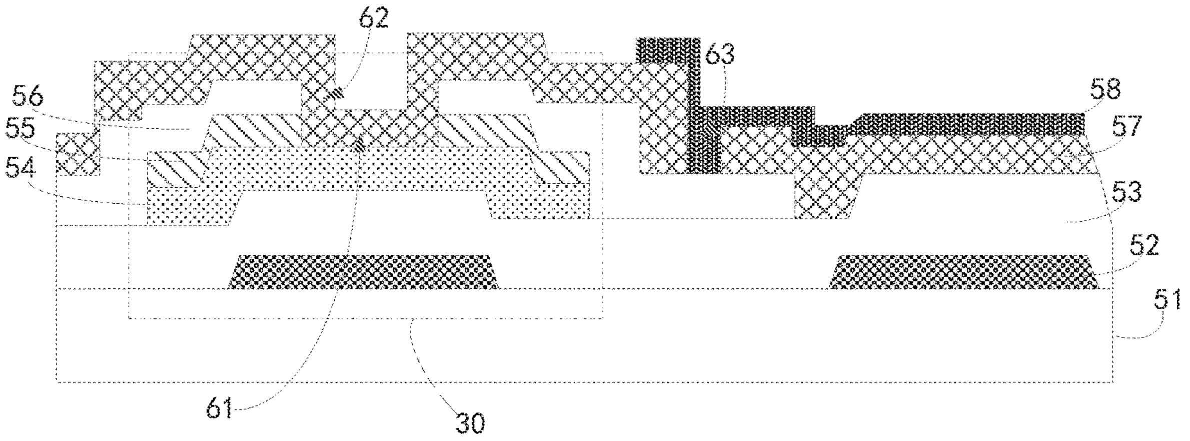
FIG. 7 is a schematic structural diagram of an array substrate according to Embodiment 1 of the present disclosure.
Figure 8:
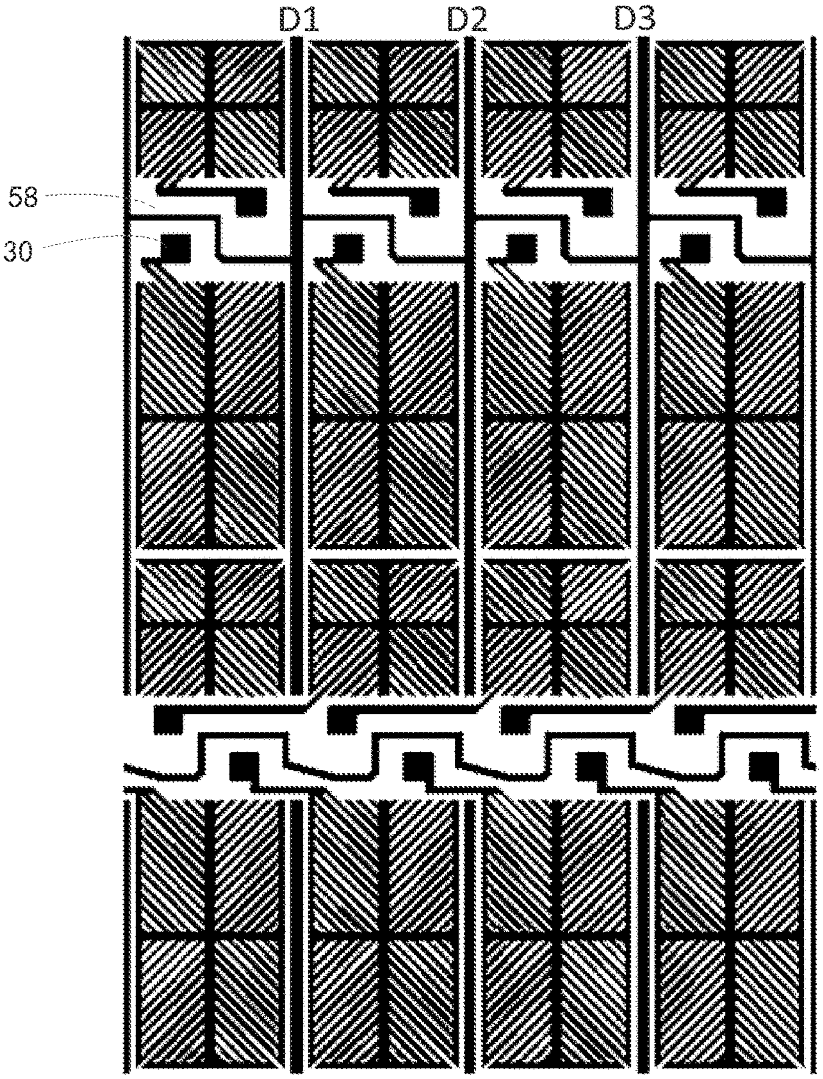
FIG. 8 is a plan view of the pixel structure according to Embodiment 1 of the present disclosure.

FIG. 7 is a schematic structural diagram of an array substrate according to Embodiment 1 of the present disclosure. FIG. 8 is a plan view of the pixel structure according to Embodiment 1 of the present disclosure.

As shown in FIGS. 7 to 8, the display panel provided in this embodiment comprises an array substrate having a plurality of thin film transistors 30, and the array substrate sequentially comprises a substrate 51, a gate layer 52, a gate insulating layer 53, a first contact layer 54, a second contact layer 55, a source and drain layer 56, an insulating layer 57, and a pixel electrode 58, from bottom to top.

Specifically, the gate layer 52 is disposed on the substrate 51. Scan lines of the display panel are prepared simultaneously as the gate layer 52 is prepared.

The gate insulating layer 53 covers the gate layer 52 and extends to a surface of the substrate 51.

An active layer is disposed on the gate insulating layer 53 and faces the gate layer 52. In this embodiment, the active layer comprises the first contact layer 54 and the second contact layer 55. In other embodiments, the active layer may be other structures, which are not particularly limited here.

The second contact layer 55 is disposed on the first contact layer 54 and at both sides of the first contact layer 54 such that the second contact layer 55 has a first through hole 61, wherein the second contact layer 55 is a semiconductor layer.

The source and drain layer 56 is disposed on the second contact layer 55 and extends from a surface of the second contact layer 55 to a surface of the gate insulating layer 53. The source and drain layer 56 comprises a source located on left side and a drain located on right side, and the source and the drain are spaced apart by a second through hole 62. Wherein data lines of the display panel are prepared simultaneously as the source and drain layer 56 is prepared.

The insulating layer 57 is disposed on the source and drain layer 56 and the gate insulating layer 53, and fills the first through hole 61 and the second through hole 62. The insulating layer 57 further comprises a third through hole 63, and the third through hole 63 penetrates the drain.

The pixel electrode 58 is disposed on the insulating layer 57, and connected to the drain through the third through hole 63, wherein the pixel electrode 58 is connected to the data line through the drain for receiving a voltage signal of the data line and driving liquid crystals to rotate. As shown in FIG. 6, the pixel electrode 58 is connected to the data line (or an extension line of a drain trace) through the cross-line manner, that is, the pixel electrode 58 is directly crosses to the data line of the thin film transistor (TFT) 40 of an adjacent sub-pixel. For a same data line, cross-column driving is realized without changing data line winding.

In this embodiment, a charging path of a pixel group connected to a same data line may be: R→G→B, G→B→R, or B→R→G, and the scan order of the scan lines is changed (that is, the opening timing of the gate is changed) from a conventional G1→G2→G3→G4→G5→G6 to G1→G3→G5→G2→G4→G6, and a corresponding sub-pixel are connected to the pixel electrode in the cross-line manner. That is, three sub-pixels of different colors and located in different columns can be simultaneously driven in the cross-line manner, so that the pixel structure realizes the twice flipping while the sub-pixels of the first row and the second row are recharged in a scan period, so that the problem of horizontal bright and dark lines is well solved, the display brightness is equalized, the problem of color crosstalk is effectively solved, and the quality of the liquid crystal display panel is further improved.

This embodiment further provides a driving method of the liquid crystal display panel, which includes the pixel structure described above, and the driving method includes following steps S1)-S2).

S1) the first driving unit inputs scan signals to scan lines in a preset order so that a first sub-pixel of each pixel group is recharged.

Specifically, with reference to FIGS. 4-6, the first driving unit 10 is electrically connected to the scan lines, and the first driving unit 10 inputs scan signals to the scan lines in the preset order, so that the first sub-pixel of each pixel group is recharged.

The pixel structure 100 has a plurality of scan periods. The first driving unit 10 first scans adjacent sub-pixels in the first to sixth lines as the first scan period, and then scans adjacent sub-pixels in the seventh to twelfth adjacent sub-pixels as the second scan period . . . and so on.

The preset order comprises: in a scan period, the first driving unit 10 first inputs scan signals to the scan lines (e.g., the scan lines G1, G3, G5) connected to the first pixel group 110*a*, and then inputs scan signals to the scan lines (e.g., the scan lines G2, G4, G6) connected to the second pixel group 110*b*. Alternatively, in a scan period, the first driving unit 10 first inputs scan signals to the scan lines (e.g., the scan lines G2, G4, G6) connected to the second pixel group 110*b*, and then inputs scan signals to the scan lines (e.g., the scan lines G1, G3, G5) connected to the first pixel group 110*a*. It should be noted that, in a scan period, the first driving unit 10 inputs scan signals to the first pixel group 110*a* and the second pixel group 110*b* connected to each data line in the above-described preset order.

When the first driving unit 10 inputs scan signals to the scan lines (e.g., the scan lines G1, G3, G5) connected to the first pixel group 110*a*, the first sub-pixel of the first pixel group 110*a* realizes recharging. From the entire pixel structure 100, that is, the sub-pixels (the first sub-pixel 101, the second sub-pixel 102, and the third sub-pixel 103) located in the first row are all recharged. When the first driving unit 10 inputs scan signals to the scan lines connected to the second pixel group 110*b*, the first sub-pixel of the second pixel group 110*b* is recharged. From the entire pixel structure 100, that is, the sub-pixels (the first sub-pixel 101, the second sub-pixel 102, and the third sub-pixel 103) located in the second row are all recharged. Therefore, when the liquid crystal display panel realizes the monochrome display, when the scan lines G1→G3→G5 are turned on, the first row of sub-pixels are recharged, when G2→G4→G6 are turned on, the second row of sub-pixels are recharged. In this case, two adjacent rows of sub-pixels with same colors in the column direction are recharged, thereby solving the problem that the horizontal bright and dark lines are prone to appear to the twice flipping pixel structure.

S2) In a scan period, a second driving unit inputs positive-polarity gray-scale voltages to data lines of odd columns, and inputs negative-polarity gray-scale voltages to data lines of even columns. Alternatively, the second driving unit inputs negative polarity gray-scale voltages to the data lines of odd columns, and inputs positive polarity gray-scale voltages to the data lines of even columns.

Figure 9:
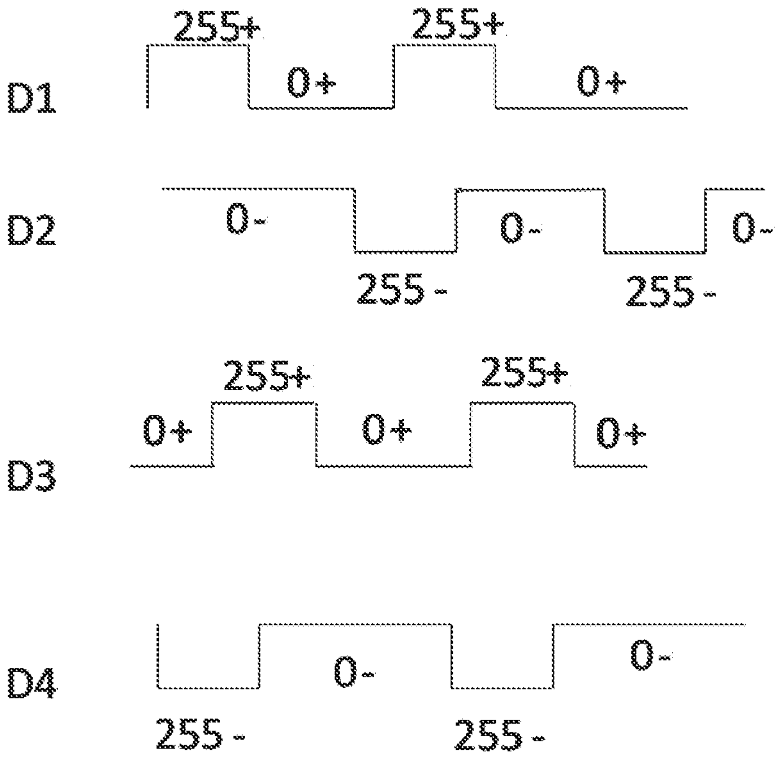
FIG. 9 is a timing diagram of data lines D1, D2, D3, and D4 in FIG. 4.

FIG. 9 is a timing diagram of the data lines D1, D2, D3 and D4 in FIG. 4.

With reference to FIGS. 6 and 9, taking realization of monochrome display on the liquid crystal display panel as an example. Signal transmission process of a pixel group of each data line is as follows:

When the first data line D1 is connected to the positive polarity gray-scale voltage, a signal change of D1 is L255+ →L0+, and the second sub-pixel 102, the third sub-pixel 103, and the first sub-pixel 101 all maintain a gray-scale voltage of L255+.

When the second data line D2 is connected to the negative polarity gray-scale voltage, a signal change of the second data line D2 is L0− →L255−, and the second sub-pixel 102, the third sub-pixel 103, and the first sub-pixel 101 all maintain a gray-scale voltage of L0−.

When the third data line D3 is connected to the positive polarity gray-scale voltage, a signal change of D3 is L0+→L255+, and the third sub-pixel 103, the first sub-pixel 101, and the second sub-pixel 102 maintain a gray-scale voltage of L0+.

When the fourth data line D4 is connected to the negative polarity gray-scale voltage, a signal change of D4 is L255− →L0−, and the first sub-pixel 101, the second sub-pixel 102, and the third sub-pixel 103 all maintain a gray-scale voltage of L255−.

In this embodiment, an execution order of the step S1) and the step S2) may be interchanged or synchronously executed, which is not particularly limited here.

This embodiment further provides a terminal, the terminal comprises a terminal body (not shown) and the liquid crystal display panel described above, and the liquid crystal display panel is connected to the terminal body. The terminal can be any product or component with display function, such as an electronic paper, a mobile phone, a tablet computer, a TV, a display device, a notebook computer, a digital photo frame, a navigator, etc.

Embodiment 2

This embodiment provides a liquid crystal display panel, a driving method, and a terminal thereof, which includes most technical features of Embodiment 1, and differences are that each pixel group comprises a first sub-pixel, a second sub-pixel, and a third sub-pixel, and in each pixel group, when the first sub-pixel is located in the x-th row and the y-th column of the pixel matrix, the second sub-pixel is located in the (x+2)-th row and a (y−1)-th column of the pixel matrix, and the third sub-pixel is located in the (x+4)-th row and a (y−2)-th column of the pixel matrix.

Figure 10:
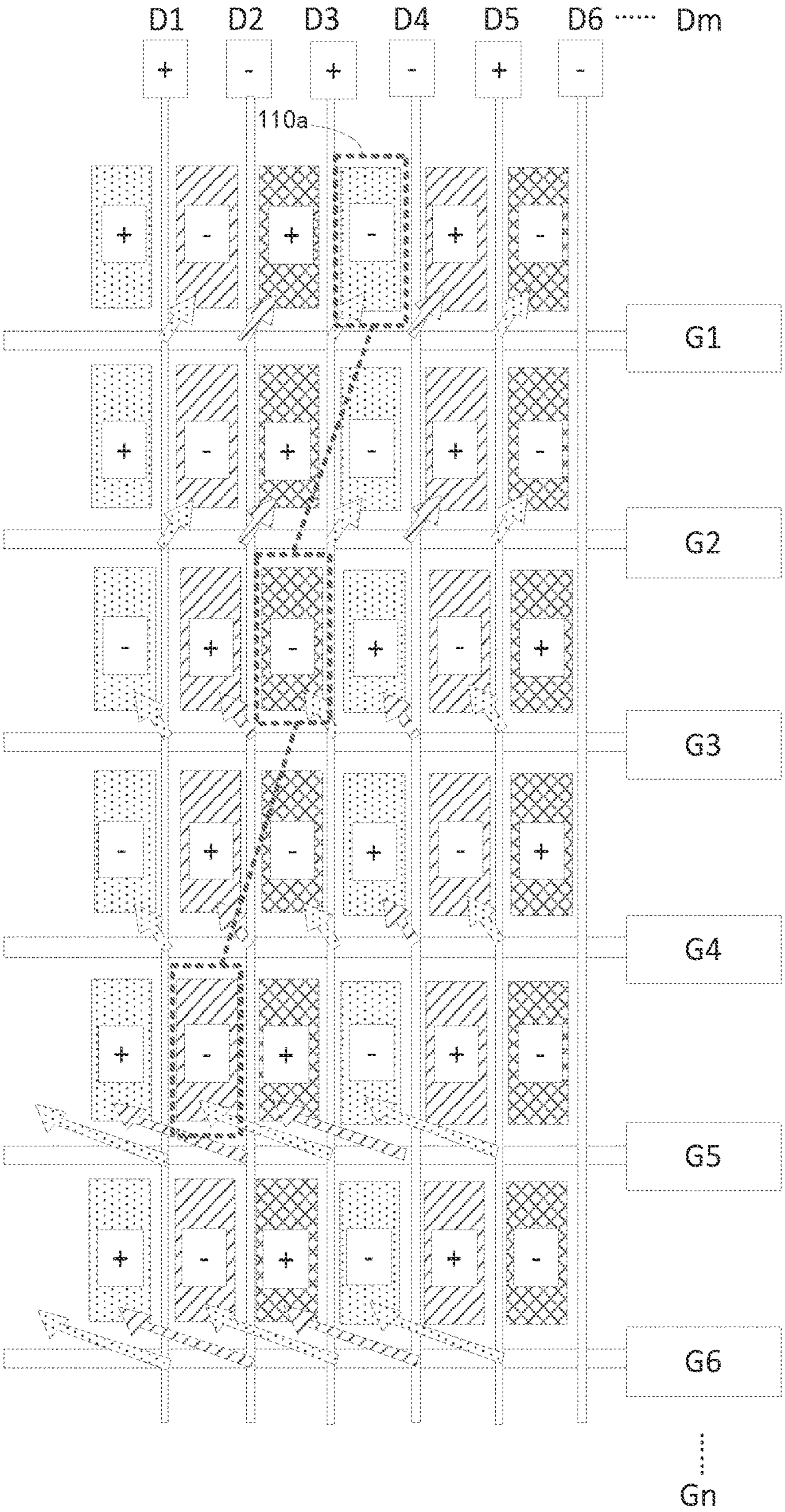
FIG. 10 is a schematic structural diagram of a first pixel group according to Embodiment 2 of the present disclosure.

FIG. 10 is a schematic structural diagram of a first pixel group according to Embodiment 2 of the present disclosure.

Figure 11:
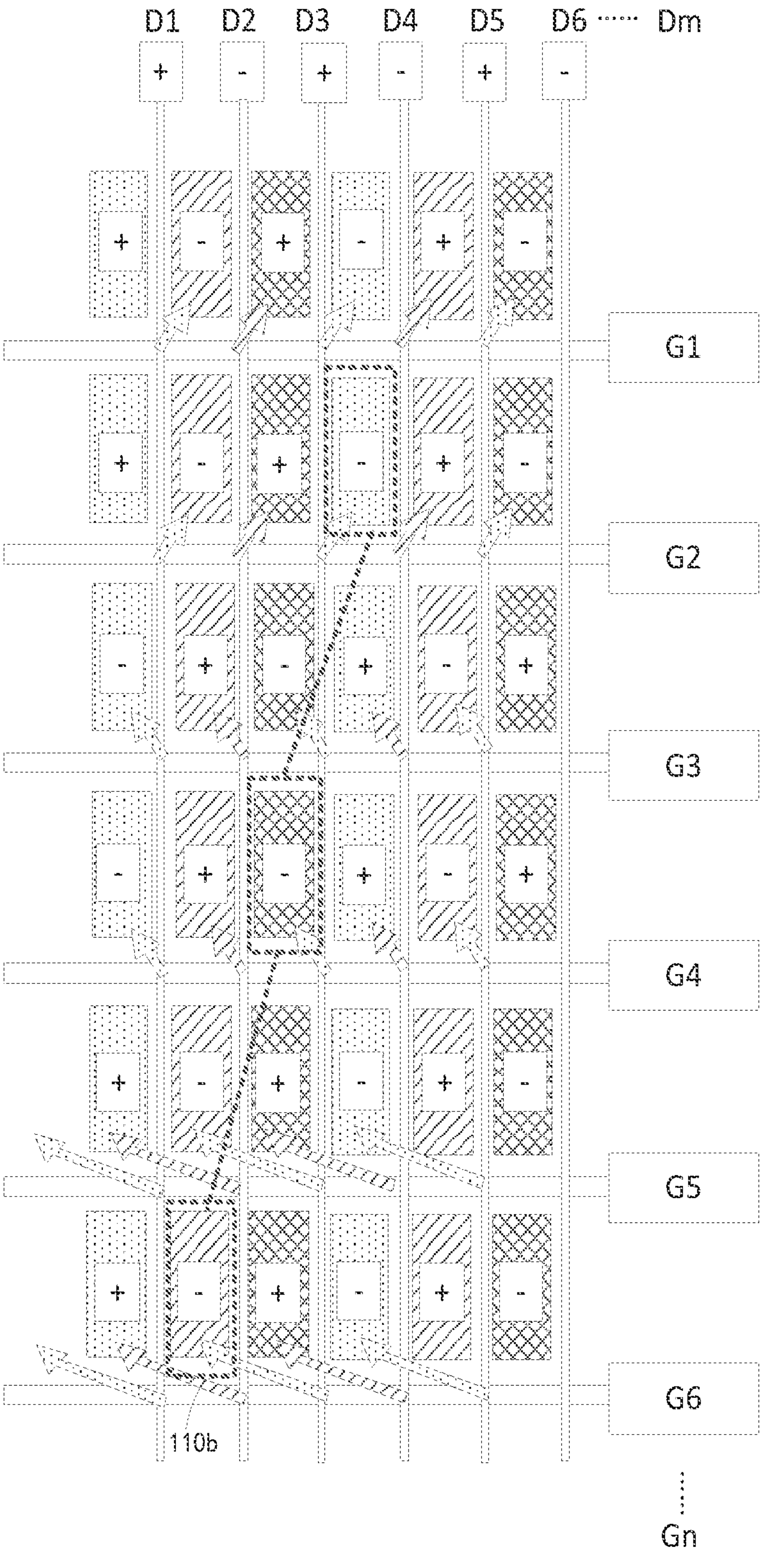
FIG. 11 is a schematic structural diagram of a second pixel group according to Embodiment 2 of the present disclosure.

FIG. 11 is a schematic structural diagram of a second pixel group according to Embodiment 2 of the present disclosure.

Specifically, as shown in FIGS. 10-11, when the first sub-pixel 101 of the first pixel group 110*a* is located in the x-th row and y-th column of the pixel matrix, the first sub-pixel 101 of the second pixel group 110*b* is located in the (x+2)-th row and the (y−1)-th column of the pixel matrix, the second sub-pixel 102 of the first pixel group 110*a* is located in the (x+3)-th row and the (y−1)-th column of the pixel matrix, the second sub-pixel 102 of the second pixel group 110*b* is located in the (x+4)-th row and the (y−1)-th column of the pixel matrix, the third sub-pixel 103 of the first pixel group 110*a* is located in the (x+4)-th row and the (y−2)-th column of the pixel matrix, and the third sub-pixel 103 of the second pixel group 110*b* is located in an (x+5)-th row and the (y−2)-th column of the pixel matrix. Wherein x, y are natural numbers, and y is greater than 1.

The liquid crystal display panel, the driving method, and the terminal thereof provided in the embodiments of the present disclosure are described in detail above. In this article, specific examples are used to explain principles and implementation of the present disclosure. The description of the above embodiments is only used to help understand technical solutions and core ideas of the present disclosure; those of ordinary skilled in the art should understand that it is still possible to modify the technical solutions recorded in the foregoing embodiments, or equivalently replace some of the technical features, and these modifications or replacements do not cause essence of corresponding technical solutions to deviate from the scope of the technical solutions of the embodiments of the present disclosure.

What is claimed is:

1. A liquid crystal display panel, comprising:

a pixel structure comprising two or more sub-pixels arranged in a pixel matrix and data lines and scan lines arranged perpendicular to each other, wherein colors of three adjacent sub-pixels located in a same row are different, colors of all sub-pixels located in a same column are same, each of the scan lines is located between two adjacent rows of sub-pixels, each of the data lines is located between two adjacent columns of sub-pixels, each of the data lines is connected to at least two pixel groups, and each of the pixel groups comprises three sub-pixels having different colors sequentially connected to the data lines; and a first driving unit electrically connected to the scan lines, and inputting scan signals to the scan lines under a preset order, wherein each of the at least two pixel groups comprises a first sub-pixel, a second sub-pixel, and a third sub-pixel, colors of the first sub-pixel, the second sub-pixel, and the third sub-pixel are different from each other, colors of all first sub-pixels of the at least two pixel groups are same, colors of all second sub-pixels of the at least two pixel groups are same, and colors of all third sub-pixels of the at least two pixel groups are same, wherein the at least two pixel groups comprise a first pixel group and a second pixel group, and each of the data lines is sequentially connected to the first sub-pixel of the first pixel group, the first sub-pixel of the second pixel group, the second sub-pixel of the first pixel group, the second sub-pixel of the second pixel group, the third sub-pixel of the first pixel group, and the third sub-pixel of the second pixel group, wherein the first sub-pixel of the first pixel group and the first sub-pixel of the second pixel group are arranged in a same column and adjacent to each other, the second sub-pixel of the first pixel group and the second sub-pixel of the second pixel group are arranged in a same column and adjacent to each other, and the third sub-pixel of the first pixel group and the third sub-pixel of the second pixel group are arranged in a same column and adjacent to each other, and wherein in each of the at least two pixel groups, the first sub-pixel, the second sub-pixel, and the third sub-pixel are arranged in one of following arrangements:

when the first sub-pixel is located in an x-th row and a y-th column of the pixel matrix, the second sub-pixel is located in an (x+2)-th row and a (y+1)-th column of the pixel matrix, and the third sub-pixel is located in an (x+4)-th row and a (y+2)-th column of the pixel matrix;

when the first sub-pixel is located in the x-th row and y-th column of the pixel matrix, the second sub-pixel is located in the (x+2)-th row and a (y−1)-th column of the pixel matrix, and the third sub-pixel is located in the (x+4)-th row and a (y−2)-th column of the pixel matrix;

when the first sub-pixel is located in an x-th row and a y-th column of the pixel matrix, the second sub-pixel is located in an (x+2)-th row and a (y+1)-th column of the pixel matrix, and the third sub-pixel is located in an (x+4)-th row and a (y−1)-th column of the pixel matrix; or when the first sub-pixel is located in the x-th row and y-th column of the pixel matrix, the second sub-pixel is located in the (x+2)-th row and the (y−1)-th column of the pixel matrix, and the third sub-pixel is located in the (x+4)-th row and the (y+1)-th column of the pixel matrix.

2. The liquid crystal display panel according to claim 1, wherein the pixel structure has at least one scan period;

the preset order comprises: in one scan period, the first driving unit first inputs scan signals to scan lines connected to the first pixel group, and then inputs scan signals to scan lines connected to the second pixel group; or in one scan period, the first driving unit first inputs scan signals to the scan lines connected to the second pixel group, and then inputs scan signals to the scan lines connected to the first pixel group.

3. The liquid crystal display panel according to claim 1, wherein the liquid crystal display panel further comprises:

a second driving unit electrically connected to the data lines; in one scan period, the second driving unit inputs positive polarity gray-scale voltages to data lines in odd columns, and inputs negative polarity gray-scale voltages to data lines in even columns; or, in one scan period, the second driving unit inputs negative polarity gray-scale voltages to the data lines in odd columns, and inputs positive-polarity gray-scale voltages to the data lines in even columns.

4. A driving method of a liquid crystal display device comprising a liquid crystal display panel, wherein the liquid crystal display panel comprises:

a pixel structure comprising two or more sub-pixels arranged in a pixel matrix and data lines and scan lines arranged perpendicular to each other, wherein colors of three adjacent sub-pixels located in a same row are different, colors of all sub-pixels located in a same column are same, each of the scan lines is located between two adjacent rows of sub-pixels, each of the data lines is located between two adjacent columns of sub-pixels, each of the data lines is connected to at least two pixel groups, and each of the pixel groups comprises three sub-pixels having different colors sequentially connected to the data lines; and a first driving unit electrically connected to the scan lines, and inputting scan signals to the scan lines under a preset order, wherein each of the at least two pixel groups comprises a first sub-pixel, a second sub-pixel, and a third sub-pixel, colors of the first sub-pixel, the second sub-pixel, and the third sub-pixel are different from each other, colors of all first sub-pixels of the at least two pixel groups are same, colors of all second sub-pixels of the at least two pixel groups are same, and colors of all third sub-pixels of the at least two pixel groups are same, wherein the at least two pixel groups comprise a first pixel group and a second pixel group, and each of the data lines is sequentially connected to the first sub-pixel of the first pixel group, the first sub-pixel of the second pixel group, the second sub-pixel of the first pixel group, the second sub-pixel of the second pixel group, the third sub-pixel of the first pixel group, and the third sub-pixel of the second pixel group, wherein the first sub-pixel of the first pixel group and the first sub-pixel of the second pixel group are arranged in a same column and adjacent to each other, the second sub-pixel of the first pixel group and the second sub-pixel of the second pixel group are arranged in a same column and adjacent to each other, and the third sub-pixel of the first pixel group and the third sub-pixel of the second pixel group are arranged in a same column and adjacent to each other, wherein in each of the at least two pixel groups, the first sub-pixel, the second sub-pixel, and the third sub-pixel are arranged in one of following arrangements:

when the first sub-pixel is located in an x-th row and a y-th column of the pixel matrix, the second sub-pixel is located in an (x+2)-th row and a (y+1)-th column of the pixel matrix, and the third sub-pixel is located in an (x+4)-th row and a (y+2)-th column of the pixel matrix;

when the first sub-pixel is located in the x-th row and y-th column of the pixel matrix, the second sub-pixel is located in the (x+2)-th row and a (y−1)-th column of the pixel matrix, and the third sub-pixel is located in the (x+4)-th row and a (y−2)-th column of the pixel matrix;

when the first sub-pixel is located in an x-th row and a y-th column of the pixel matrix, the second sub-pixel is located in an (x+2)-th row and a (y+1)-th column of the pixel matrix, and the third sub-pixel is located in an (x+4)-th row and a (y−1)-th column of the pixel matrix; or when the first sub-pixel is located in the x-th row and y-th column of the pixel matrix, the second sub-pixel is located in the (x+2)-th row and the (y−1)-th column of the pixel matrix, and the third sub-pixel is located in the (x+4)-th row and the (y+1)-th column of the pixel matrix, and wherein the driving method comprises following steps:

the first driving unit inputs scan signals to the scan lines in the preset order, so that a first sub-pixel of each of the pixel groups is recharged.

5. The driving method according to claim 4, wherein the pixel structure has at least one scan period;

the preset order comprises: in one scan period, the first driving unit first inputs scan signals to scan lines connected to the first pixel group, and then inputs scan signals to scan lines connected to the second pixel group; or in one scan period, the first driving unit first inputs scan signals to the scan lines connected to the second pixel group, and then inputs scan signals to the scan lines connected to the first pixel group.

6. The driving method according to claim 5, wherein when the first driving unit inputs scan signals to the scan lines connected to the first pixel group, the first sub-pixel of the first pixel group realizes recharging; and when the first driving unit inputs scan signals to the scan lines connected to the second pixel group, the first sub-pixel of the second pixel group realizes recharging.

7. The driving method according to claim 6, wherein the liquid crystal display panel further comprises a second driving unit electrically connected to the data lines; and the driving method further comprising:

in one scan period, the second driving unit inputs positive polarity gray-scale voltages to data lines in odd columns, and inputs negative-polarity gray-scale voltages to data lines in even columns; or, in one scan period, the second driving unit inputs negative polarity gray-scale voltages to the data lines in odd columns, and inputs positive polarity gray-scale voltages to the data lines in even columns.

8. A terminal, wherein the terminal comprises a terminal body and a liquid crystal display panel, and the liquid crystal display panel is connected to the terminal body, wherein the liquid crystal display panel comprises:

a pixel structure comprising two or more sub-pixels arranged in a pixel matrix and data lines and scan lines arranged perpendicular to each other, wherein colors of three adjacent sub-pixels located in a same row are different, colors of all sub-pixels located in a same column are same, each of the scan lines is located between two adjacent rows of sub-pixels, each of the data lines is located between two adjacent columns of sub-pixels, each of the data lines is connected to at least two pixel groups, and each of the pixel groups comprises three sub-pixels having different colors sequentially connected to the data lines; and a first driving unit electrically connected to the scan lines, and inputting scan signals to the scan lines under a preset order, wherein each of the at least two pixel groups comprises a first sub-pixel, a second sub-pixel, and a third sub-pixel, colors of the first sub-pixel, the second sub-pixel, and the third sub-pixel are different from each other, colors of all first sub-pixels of the at least two pixel groups are same, colors of all second sub-pixels of the at least two pixel groups are same, and colors of all third sub-pixels of the at least two pixel groups are same, wherein the at least two pixel groups comprise a first pixel group and a second pixel group, and each of the data lines is sequentially connected to the first sub-pixel of the first pixel group, the first sub-pixel of the second pixel group, the second sub-pixel of the first pixel group, the second sub-pixel of the second pixel group, the third sub-pixel of the first pixel group, and the third sub-pixel of the second pixel group, wherein the first sub-pixel of the first pixel group and the first sub-pixel of the second pixel group are arranged in a same column and adjacent to each other, the second sub-pixel of the first pixel group and the second sub-pixel of the second pixel group are arranged in a same column and adjacent to each other, and the third sub-pixel of the first pixel group and the third sub-pixel of the second pixel group are arranged in a same column and adjacent to each other, and wherein in each of the at least two pixel groups, the first sub-pixel, the second sub-pixel, and the third sub-pixel are arranged in one of following arrangements:

when the first sub-pixel is located in an x-th row and a y-th column of the pixel matrix, the second sub-pixel is located in an (x+2)-th row and a (y+1)-th column of the pixel matrix, and the third sub-pixel is located in an (x+4)-th row and a (y+2)-th column of the pixel matrix;

when the first sub-pixel is located in the x-th row and y-th column of the pixel matrix, the second sub-pixel is located in the (x+2)-th row and a (y−1)-th column of the pixel matrix, and the third sub-pixel is located in the (x+4)-th row and a (y−2)-th column of the pixel matrix;

when the first sub-pixel is located in an x-th row and a y-th column of the pixel matrix, the second sub-pixel is located in an (x+2)-th row and a (y+1)-th column of the pixel matrix, and the third sub-pixel is located in an (x+4)-th row and a (y−1)-th column of the pixel matrix; or when the first sub-pixel is located in the x-th row and y-th column of the pixel matrix, the second sub-pixel is located in the (x+2)-th row and the (y−1)-th column of the pixel matrix, and the third sub-pixel is located in the (x+4)-th row and the (y+1)-th column of the pixel matrix.

9. The terminal according to claim 8, wherein the pixel structure has at least one scan period;

the preset order comprises: in one scan period, the first driving unit first inputs scan signals to scan lines connected to the first pixel group, and then inputs scan signals to scan lines connected to the second pixel group; or in one scan period, the first driving unit first inputs scan signals to the scan lines connected to the second pixel group, and then inputs scan signals to the scan lines connected to the first pixel group.

10. The terminal according to claim 8, wherein the terminal further comprises:

a second driving unit electrically connected to the data lines; in one scan period, the second driving unit inputs positive polarity gray-scale voltages to data lines in odd columns, and inputs negative polarity gray-scale voltages to data lines in even columns; or, in one scan period, the second driving unit inputs negative polarity gray-scale voltages to the data lines in odd columns, and inputs positive polarity gray-scale voltages to the data lines in even columns.

* * * * *